United States Patent [11] 3,564,306

| [72] | Inventors | Hanns Ott<br>Harsdorferstr. 44, Nurenberg;<br>Jurgen Wenk, Ebrardstr. 62, Erlangen,<br>Germany |
|---|---|---|
| [21] | Appl. No. | 777,444 |
| [22] | Filed | Nov. 20, 1968 |
| [45] | Patented | Feb. 16, 1971 |
| [32] | Priority | Nov. 30, 1967 |
| [33] | | Germany |
| [31] | | 1,572,502 |

[54] DRIVE DEVICE FOR BATTERY ENERGIZED SOUND RECORDING APPARATUS
4 Claims, 4 Drawing Figs.

[52] U.S. Cl. ........................................ 310/10,
310/67, 310/68, 310/157, 310/162
[51] Int. Cl. ........................................... H02k 19/00
[50] Field of Search............................ 310/10,
157, 67, 162, 3, 5, 156, 68.2, 68.4

[56] References Cited
UNITED STATES PATENTS

| 3,293,457 | 12/1966 | Mori et al. ................ | 310/10 |
| 3,329,845 | 6/1967 | Lear......................... | 310/156X |
| 3,390,291 | 6/1968 | Eberline et al.............. | 310/156 |

FOREIGN PATENTS

| 726,456 | 3/1932 | France ..................... | 310/67 |

*Primary Examiner*—D. X. Sliney
*Attorneys*—Curt M. Avery, Arthur E. Wilfond, Herbert L. Lerner and Daniel J. Tick ABSTRACT: A drive device for driving the sound record medium of battery energized sound recording apparatus comprises a battery supply and a direct current brushless motor energized from the battery supply and having a shaft driving the sound record medium. The shaft is thus a tone shaft. The motor comprises a stator having an axial bore formed therethrough and a rotor coaxially positioned around the stator. The stator has a plurality of half open slots formed therein and a multipole stator winding in the slots comprising a pair of separated phase windings mounted in the slots in a manner whereby they are electrically displaced by 90° each of the phase windings comprises two wires.

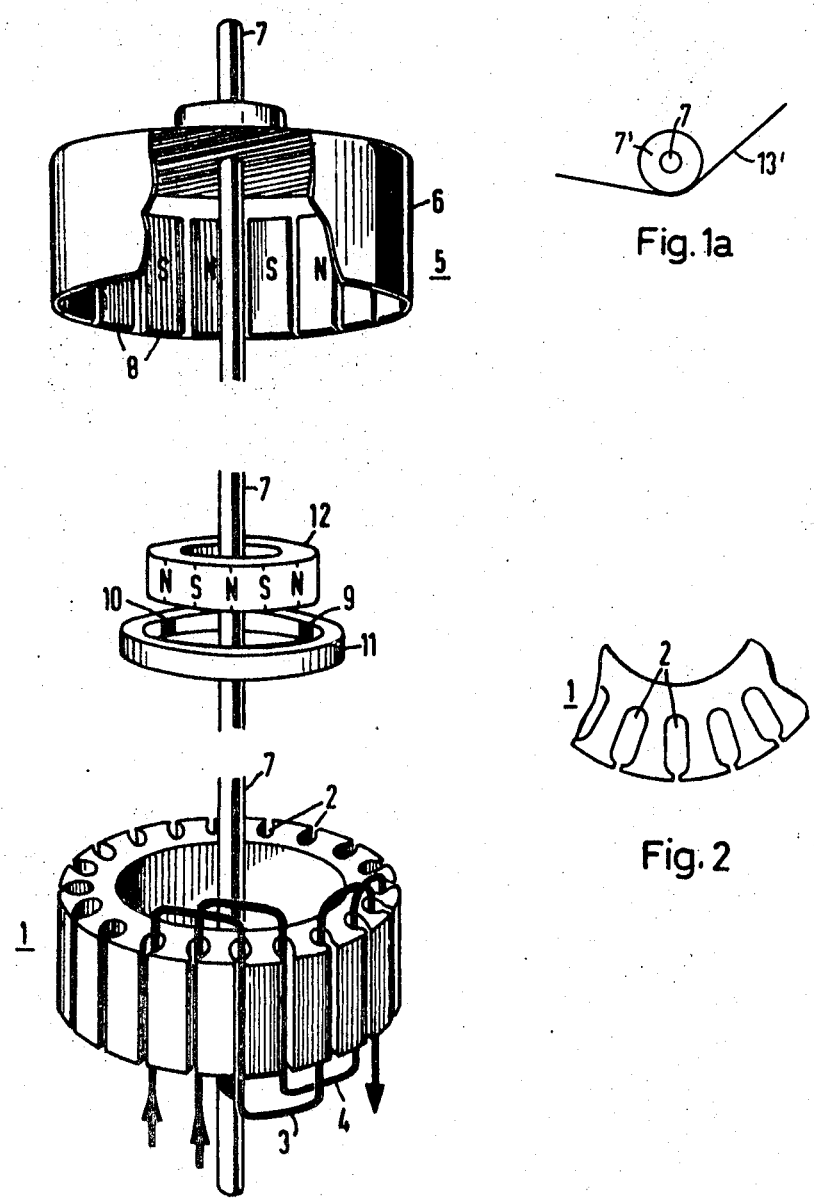

DRIVE DEVICE FOR BATTERY ENERGIZED SOUND RECORDING APPARATUS

DESCRIPTION OF THE INVENTION

The present invention relates to battery energized sound recording apparatus. More particularly, the invention relates to a drive device for driving the sound record medium of battery energized sound recording apparatus.

It is customary to utilize high speed DC miniature motors to drive battery energized sound recording apparatus. The DC miniature or midget motors utilized may be either brushless or with commutator brushes. Brushless or commutatorless DC motors are preferable for driving battery energized sound recording apparatus, since they have considerable advantages over miniature motors having brushes. The advantages of brushless motors include low noise, uninterrupted continuous running, little or no wear and tear on the motor, and so on.

Belt and friction gear transmissions are utilized to transmit power to the slow running shaft which drives the sound record medium or tape. It is necessary to utilize a flywheel mounted on the tone shaft or transmission member, in order to compensate for speed fluctuations which are unavoidable in such transmission arrangements. This is the case, since, especially in high fidelity equipment, temporary speed fluctuations of the tone shaft must be less than 1.5 percent of the rated speed.

The principal object of the present invention is to provide a new and improved drive device for battery energized sound recording apparatus.

An object of the present invention is to provide a new and improved drive device for driving the sound record medium of battery energized sound recording apparatus.

An object of the present invention is to provide a drive device for driving the magnetic tape of battery energized sound recording apparatus, which drive device is of simple structure but reliable, efficient and effective in operation.

In accordance with the present invention, a drive device for driving the sound record medium of battery energized sound recording apparatus comprises a multipole brushless motor having a shaft driving the sound record medium. The shaft thereby functions as a tone shaft.

A conventional two pole DC miniature motor does not provide the necessary low speed at good synchronization. In accordance with the present invention, therefore, the motor comprises a stator and a rotor coaxially positioned around the stator. This type of motor permits the necessary synchronization in a relatively simple manner. In accordance with the present invention, the stator comprises a plurality of laminated sheets having a plurality of half open slots formed therein and a multipole stator winding in the slots. The stator winding comprises a pair of separated phase windings mounted in the slots of the stator in a manner whereby they are electrically displaced by 90°.

Each of the phase windings of the stator winding may comprise two wires. Each of such phase windings may comprise a number of wires equal to a multiple of two. A circuit functions to connect into circuit a selected number of turns of each of the phase windings to enhance the efficiency of the motor at various rated speeds. The stator winding may be a three phase winding comprising a plurality of separated phase windings mounted in the slots of the stator in a manner whereby they are electrically displaced by 120°.

The rotor comprises a ferromagnetic member comprising a hollow cylindrical portion and a disc portion closing one base of the cylindrical portion. The cylindrical portion has an inner cylindrical surface and a plurality of platelets are affixed to the inner surface of the cylindrical portion of the rotor in alternate polarities. The magnetic platelets are equal in number to the number of poles of the motor. The magnetic platelets comprise either barium ferrite or strontium ferrite.

The stator has an axial bore formed therethrough. Control means is provided in the bore of the stator for controlling the connection into circuit of the wires of the phase windings. The control means comprises a magnetized control rotor mounted on the shaft of the motor in the bore of the stator and galvanomagnetic elements in operative proximity with the control rotor in the bore and connected in the circuit. The galvanomagnetic elements comprise Hall generators.

In order that the present invention may be readily carried into effect, it will now be described with reference to the accompanying drawings, wherein:

FIG. 1 is an exploded perspective diagrammatic view of an embodiment of the drive device, excluding the circuit, of the present invention;

FIG. 1a is a schematic diagram of the driving of the magnetized tape of the battery energized sound recording apparatus by the drive device of the present invention;

FIG. 2 is a top view of a portion of a lamination of the stator of the drive device of FIG. 1.

Figure 3:
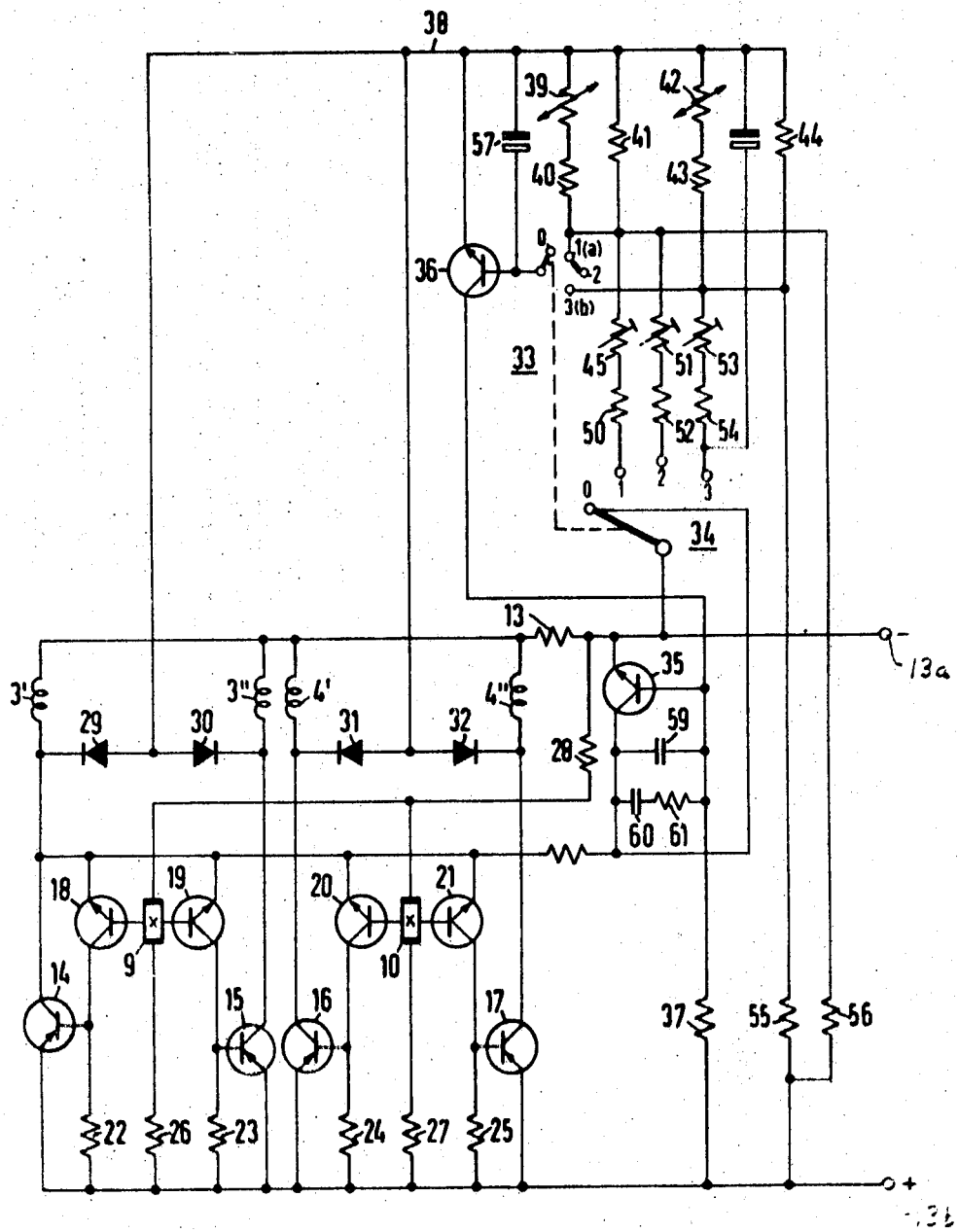
FIG. 3 is an embodiment of a control circuit of the drive device of the present invention.

In FIG. 1, a stationary stator of the brushless or commutatorless multipole DC motor of the drive device comprises a plurality of laminated sheets. The laminated sheets function in the usual manner to reduce power losses. A plurality of equiangularly spaced half open slots 2 are formed in the stator 1. The slots 2 extend parallel to the axis of the device (FIGS. 1 and 2) and are formed in the periphery or circumferential surface of the stator 1. The number Z of slots 2 is determined by the number of pole pairs of the motor. The number Z of slots 2 is equal to 4 times the number $p$ of pole pairs, so that $Z = 4p$. Thus, for example, if the motor has 8 pole pairs, there are 32 slots formed in the stator thereof.

The stator winding comprises a pair of separated phase windings 3 and 4 mounted in the slots 2 of the stator 1 in a manner whereby they are electrically displaced by 90°. The phase windings 3 and 4 may be spiral or lap windings. In order to facilitate the operation of the control circuit, hereinafter described, each phase winding preferably comprises two wires. Each phase winding may comprise a number of wires equal to a multiple of 2. This permits the reversal of the field of the motor simply and facilely via the control circuit, by alternate control of a respective phase half, as described with reference to FIG. 3. As hereinafter described, the control circuit functions to connect into circuit a selected number of turns of the phase windings to enhance the efficiency of the motor at various rated speeds.

A rotor 5 is coaxially positioned around the stator 1. The rotor 5 comprises a ferromagnetic member 6 comprising a hollow cylindrical portion and a disc portion closing one base of the cylindrical portion. The ferromagnetic member 6 is coaxially affixed to the motor shaft 7 and rotates therewith. In accordance with the present invention, the motor shaft 7 is the tone shaft and drives the magnetized tape.

The cylindrical portion of the ferromagnetic member 6 has an inner cylindrical surface. A plurality of magnetic platelets 8 are affixed to the inner cylindrical surface of the ferromagnetic member 6. The magnetic platelets 8 are magnetized with alternate polarities, so that the magnetic poles are in the sequence N S N S N, and so on. The number of magnetic platelets 8 is equal in number to the number of poles of the motor or twice the number $p$ of pole pairs. The ferromagnetic member 6 provides the magnetic circuit for the platelets 8, as well as for the stator 1.

The magnetic platelets 8 of the ferromagnetic member 6 are positioned in the operating air gap of the stator 1. In order to maintain a small air gap, the magnetic platelets 8 preferably comprise a material having a high coercive field intensity such as, for example, barium ferrite or strontium ferrite. This permits the magnetic platelets 8 to have very slight radial dimensions and provides the advantage of a magnetic optimum for the stator 1 and the rotor 5, whereby a high degree of effectiveness is obtained.

The control of the connection into circuit of the wires of the phase windings 3 and 4 is accomplished by a control device positioned in the axial bore formed through the stator 1. The control device comprises a magnetized control rotor 12 coaxially mounted on the shaft 7 of the motor in the bore of the stator 1. The control rotor comprises a permanent magnet of annular configuration, having a number of pole pairs which is equal to the number of pole pairs of the motor. The control device further comprises a pair of galvanomagnetic elements 9 and 10 mounted on an annular member 11 which is coaxially positioned around the control rotor 12 in the bore of the stator 1. The annular member 11 is affixed to the stator 1 in the bore thereof, and the galvanomagnetic elements 9 and 10 are mounted on the inner cylindrical surface of said annular member at an electrical displacement of 90° from each other.

The galvanomagnetic elements 9 and 10 may be controlled by the magnetic platelets 8. This may be accomplished by mounting the galvanomagnetic elements in recesses or grooves formed in the outer cylindrical surface of the stator 1 (not shown in the FIGS.). Furthermore, the galvanomagnetic elements 9 and 10 may be FIGS.). on a planar surface of the stator 1. This, however, requires a structure of larger dimensions.

The control device provides the advantage of enabling the shape of the controlled flux to be selected independently of the rotor, in accordance with the control circuit. This may be accomplished only by influencing the field distribution of the rotor magnets 8 in the region, zone or area of the control elements by magnetic shunts (not shown in the FIGS.) which must be provided on the rotor. The control device is highly preferable since it is positioned in the bore of the stator 1, thereby utilizing available space to the maximum.

The operation of the motor shaft 7 as a tone shaft, in accordance with the present invention, is shown in FIG. 1a, wherein said motor shaft drives a magnetic tape 13' via a friction roller 7'.

The motor of the present invention is controlled by the control circuit of FIG. 3. In FIG. 3, the two wires of the phase winding 3 are shown as inductances 3' and 3'', 3' being one phase half and 3'' being the other phase half. The two wires of the phase winding 4 are shown as inductances 4' and 4'', 4' being one phase half and 4'' being the other phase half.

The wires or windings 3', 3'', 4' and 4'' are connected in common with each other at one end thereof and their common connection is extended to the negative polarity terminal 13a of a source of voltage supply via a resistor 13. The source of voltage supply has a positive polarity terminal 13b. The other end of the winding 3' is connected to the positive polarity terminal 13b via a switching transistor 14. The other end of the winding 3'' is connected to the positive polarity terminal 13b via a switching transistor 14. The other end of the winding 3'' is connected to the positive polarity terminal 13b via a switching transistor 15. The other end of the winding 4' is connected to the positive polarity terminal 13b via a switching transistor 16. The other end of the winding 4'' is connected to the positive polarity terminal 13b via a switching transistor 17.

The switching transistors 14, 15, 16 and 17 are controlled in conductive condition by the galvanomagnetic elements 9 and 10 via transistors 18, 19, 20 and 21, respectively. The galvanomagnetic elements 9 and 10 are, in the illustrated example, Hall generators. A resistor 22 functions to divert the residual collector current of the transistor 18. A resistor 23 functions to divert the residual collector current of the transistor 19. A resistor 24 functions to divert the residual collector current of the transistor 20. A resistor 25 functions to divert the residual collector current of the transistor 21.

The Hall generator 9 has one control current electrode connected to the negative polarity terminal 13a via a resistor 28 and the other control current electrode connected to the positive polarity terminal 13b via a resistor 26. The Hall voltage electrodes of the Hall generator 9 are connected directly to the base electrodes of the transistors 18 and 19, respectively. The Hall generator 10 has one control current electrode connected to the negative polarity terminal 13a via the resistor 28 and the other control current electrode connected to the positive polarity terminal 13b via a resistor 27. The Hall voltage electrodes of the Hall generator 13 are connected to the base electrodes of the transistors 20 and 21, respectively.

In order to provide an electrical signal having a magnitude which is proportional to the speed of the rotor, as a regulating signal for said speed, the EMF of the stator windings 3', 3'' is derived via a pair of diodes 29 and 30 and the EMF of the windings 4', 4'' is derived via a pair of diodes 31 and 32. The derived speed-proportional signals are supplied from the pairs of diodes to speed-regulating or controlling circuitry via a lead 38. A selector switch 34 in the speed control circuit permits the presetting of three regulated speeds in the control circuit of FIG. 3. In the zero position of the selector switch 34, the motor operates at an uncontrolled or nonregulated speed.

During the operation of the motor at a regulated or controlled speed, a transistor 35, connected in common to the transistors 18, 19, 20 and 21, varies the emitter current of said transistors and thereby varies the base current of the switching transistors 14, 15, 16 and 17, in accordance with the load of the motor. The base current of the switching transistors 14, 15, 16 and 17 is thereby varied in a manner whereby the speed of the motor remains constant. This is accomplished by comparing the currents at the base electrode of the transistor 35 and supplying the difference current to said base electrode. The compared currents are supplied to the base electrode of the transistor 35 via a resistor 37 and a regulating transistor 36, connected to said base electrode.

The current flowing through the regulating transistor 36 is provided via three adjustable voltage dividers by the speed-proportional EMF which occurs between the negative polarity terminal 13a and the lead 38. The transistor 35 is bypassed when the selector switch 34 is in its zero position, so that there is then no control or regulation of speed, and the motor operates at a maximum speed dependent upon the load and the voltage.

The selector switch 34 has two switch arms, one of which operates in cooperation with contacts 0, 1a, 2 and 3b, said switch arm being directly connected at one end to the base electrode of the transistor 36. The other switch arm of the selector switch 34 operates in cooperation with contacts 0, 1, 2 and 3, said switch arm being directly connected at one end to the negative polarity terminal 13a. The switch arms of the selector switch 34 are mechanically coupled to each other and move in conjunction with each other. The speed control circuit 33 includes a pair of thermistors 39 and 42 which function to compensate for temperature variations.

When the motor is to rotate at high and intermediate speeds, resistors 39, 40 and 41 provide the common, lower resistance of the voltage divider. Resistors 45 and 50, or 51 and 52, are selectively connected to the negative polarity terminal 13a via the selector switch 34. When the motor is to rotate at low speeds, resistors 42, 43, 53 and 54 provide the voltage divider resistance and are connected to the negative polarity terminal 13a via the selector switch 34.

Resistors 55 and 56 and a capacitor 57 function to compensate for fluctuations in the voltage supply. The resistor 13 functions to suppress the effect of the armature reaction of the EMF. An RC circuit 59, 60, 61 is connected between the collector and base electrodes of the transistor 35 and functions to smooth or filter the regulated voltage as well as to improve the frequency of regulation.

The rotor 5 may be mounted on the motor shaft 7 in the bore of the stator 1, rather than around said stator. Furthermore, the stator winding may comprise a three phase winding comprising a plurality of separated phase windings mounted in the slots 2 of the stator 1 in a manner whereby they are electrically displaced by 120°.

While the invention has been described by means of a specific example and in a specific embodiment, we do not wish to be limited thereto, for obvious modifications will occur to those skilled in the art without departing from the spirit and scope of the invention.

We claim:

1. A drive device for driving the sound record medium of battery energized sound recording apparatus, said drive device comprising a battery supply and a direct current brushless motor energized from said battery supply and having a shaft driving said sound record medium, said shaft thereby being a tone shaft, said motor comprising a stator having an axial bore formed therethrough and a rotor coaxially positioned around said stator, said stator having a plurality of half open slots formed therein and a multipole stator winding in said slots comprising a pair of separated phase windings mounted in said slots in a manner whereby they are electrically displaced by 90°, each of said phase windings comprising two wires, and further comprising control means in the bore formed through said stator for controlling the connection into circuit of the wires of said phase windings.

2. A drive device as claimed in claim 1, wherein said control means comprises a magnetized control rotor mounted on the shaft of said motor in the bore of said stator and galvanomagnetic means in operative proximity with said control rotor in said bore.

3. A drive device as claimed in claim 1, further comprising circuit means for connecting into circuit a selected number of turns of each of said phase windings to enhance the efficiency of said motor at various rated speeds, and wherein said control means comprises a magnetized control rotor mounted on the shaft of said motor in the bore of said stator and galvanomagnetic elements in operative proximity with said control rotor in said bore and connected in said circuit means.

4. A drive device as claimed in claim 3, wherein said galvanomagnetic elements comprise Hall generators.

UNITED STATES PATENT OFFICE
CERTIFICATE OF CORRECTION

Patent No. 3,564,306            Dated February 16, 1971

Inventor(s)    Hanns Ott et al.

It is certified that error appears in the above-identified patent and that said Letters Patent are hereby corrected as shown below:

On the cover sheet insert -- [73] Assignee Siemens Aktiengesellschaft, Berlin and Munchen, Germany, a corporation of Germany Signed and sealed this 2nd day of November 1971.

(SEAL)
Attest:

EDWARD M. FLETCHER, JR.        ROBERT GOTTSCHALK
Attesting Officer               Acting Commissioner of Pate